(12) United States Patent
Hwang et al.

(10) Patent No.: US 9,843,560 B2
(45) Date of Patent: Dec. 12, 2017

(54) AUTOMATICALLY VALIDATING ENTERPRISE FIREWALL RULES AND PROVISIONING FIREWALL RULES IN COMPUTER SYSTEMS

(71) Applicant: International Business Machines Corporation, Armonk, NY (US)

(72) Inventors: Jinho Hwang, Ossining, NY (US); Christopher R. Dotson, Lexington, KY (US); Brian Peterson, Ridgefield, CT (US); Frederick Y.-F. Wu, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 14/851,981

(22) Filed: Sep. 11, 2015

(65) Prior Publication Data
US 2017/0078329 A1    Mar. 16, 2017

(51) Int. Cl.
H04L 29/06    (2006.01)

(52) U.S. Cl.
CPC .............................. H04L 63/0263 (2013.01)

(58) Field of Classification Search
CPC . H04L 63/20; H04L 63/0236; H04L 63/0263; H04L 63/02
USPC .............................................................. 726/1
See application file for complete search history.

(56) References Cited

U.S. PATENT DOCUMENTS

| | | | |
|---|---|---|---|
| 8,423,483 B2 | 4/2013 | Sadeh-Koniecpol et al. | |
| 8,621,552 B1* | 12/2013 | Lotem ..................... | H04L 63/20 709/223 |
| 2004/0015719 A1 | 1/2004 | Lee et al. | |
| 2007/0299984 A1 | 12/2007 | Roy et al. | |
| 2010/0325588 A1* | 12/2010 | Reddy ..................... | G06F 3/048 715/853 |
| 2014/0068698 A1* | 3/2014 | Burchfield .......... | H04L 63/0263 726/1 |

FOREIGN PATENT DOCUMENTS

WO    WO2004008271 A2    1/2004

OTHER PUBLICATIONS

Yuan, Lihua, et al. "Fireman: A toolkit for firewall modeling and analysis." Security and Privacy, 2006 IEEE Symposium on. IEEE, 2006.*

(Continued)

*Primary Examiner* — Syed Zaidi
(74) *Attorney, Agent, or Firm* — Scully, Scott, Murphy & Presser, P.C.; Louis J. Percello, Esq.

(57) ABSTRACT

Automatically validating a firewall rule for provisioning in a computer system. One or more firewall rules for provisioning on a server is received from a user device. Based on predefined firewall rules, whether to approve one or more of the firewall rules and deny one or more of the firewall rules is determined. Responsive to determining that one or more of the firewall rules are denied, additional validation of one or more of the firewall rules that are denied are performed. A firewall rule learning engine is updated with a result of the additional validation. Based on the result of the additional validation, the firewall rule learning engine updates the predefined firewall rules. One or more of the firewall rules that are approved on the server may be provisioned.

18 Claims, 6 Drawing Sheets

(56) References Cited

OTHER PUBLICATIONS

K. K Golnabi, R. K. Min, L. Khan and E. Al-Shaer, "Analysis of Firewall Policy Rules Using Data Mining Techniques," 2006 IEEE/IFIP Network Operations and Management Symposium NOMS 2006, Vancouver, BC, 2006, pp. 305-315.*

* cited by examiner

| SOURCE | DEST | PORT | PROTOCOL | AUTHENTICATE | CONFIDENTIAL INFORMATION? | SENSITIVE PERSONAL INFORMATION? | ENCRYPTED? | FOR TUNNEL? | ALLOW INTERACTIVE LOGIN? | RESULT | REASON |
|---|---|---|---|---|---|---|---|---|---|---|---|
| RED | YELLOW | tcp/445 | CIFS | | FALSE | FALSE | FALSE | FALSE | FALSE | DENIED | RED → YELLOW DENIED FOR CIFS |
| RED | YELLOW | tcp/22 | SSH | IN PASSWORD OR SECRET, KEY OR CERTIFICATE | FALSE | FALSE | FALSE | FALSE | FALSE | APPROVED | RED → YELLOW ALLOWED FOR SSH WITH KEY OR CERTIFICATE |

FIG. 2

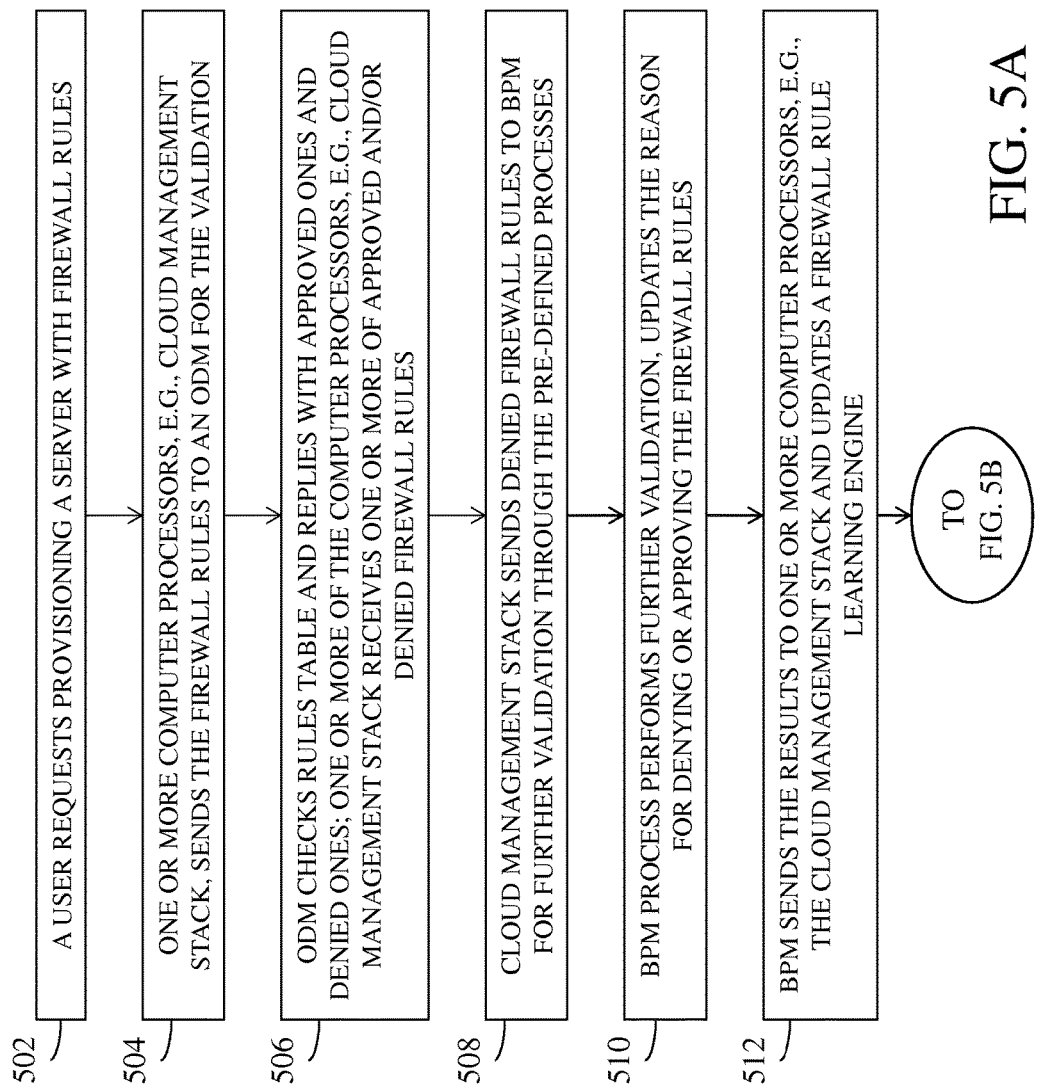

AUTOMATICALLY VALIDATING ENTERPRISE FIREWALL RULES AND PROVISIONING FIREWALL RULES IN COMPUTER SYSTEMS

FIELD

The present application relates generally to computers, computer applications, and computer network security and more particularly to automatically validating firewall rules in computer systems.

BACKGROUND

Computer systems may be configured with firewall rules to control a computer system network security and intrusion detection, for example, to block or allow, inbound and outbound traffic flowing in and out of the computer systems, for example, via a computer communication network.

The present disclosure in one embodiment presents an intelligent system that validates firewall rules and also learns firewall rules to validate and invalidate automatically.

BRIEF SUMMARY

A computer-implemented method and system of automatically validating a firewall rule for provisioning in a computer system may be provided. The method, in one aspect, may include receiving from a user device one or more firewall rules for provisioning on a server. The method may also include determining based on predefined firewall rules, whether to approve one or more of the firewall rules and deny one or more of the firewall rules. The method may also include responsive to determining that one or more of the firewall rules are denied, performing additional validation of one or more of the firewall rules that are denied. The method may also include updating a firewall rule learning engine with a result of the additional validation, wherein based on the result of the additional validation, the firewall rule learning engine updates the predefined firewall rules. The method may also include provisioning one or more of the firewall rules that are approved on the server.

A system of automatically validating a firewall rule for provisioning in a computer system, in one aspect, may include a storage device and one or more computer processors operatively coupled to a communication network, one or more of the computer processors operable to receive from a user device one or more firewall rules for provisioning on a server. One or more of the computer processors operable to determine based on predefined firewall rules stored on the storage device, whether to approve one or more of the firewall rules and/or deny one or more of the firewall rules. Responsive to determining that one or more of the firewall rules are denied, one or more of the computer processors may be operable to perform additional validation of one or more of the firewall rules that are denied. One or more of the computer processors may be further operable to update a firewall rule learning engine with a result of the additional validation, the firewall rule learning engine coupled to one or more of the computer processors. Based on the result of the additional validation, the firewall rule learning engine may be operable to update the predefined firewall rules. One or more of the computer processors may be further operable to provision one or more of the firewall rules that are approved on the server.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 shows an example ODM rule validation table in one embodiment of the present disclosure.

FIGS. 5A and 5B show a flow diagram showing a process overview in one embodiment of the present disclosure.

DETAILED DESCRIPTION

Figure 1:
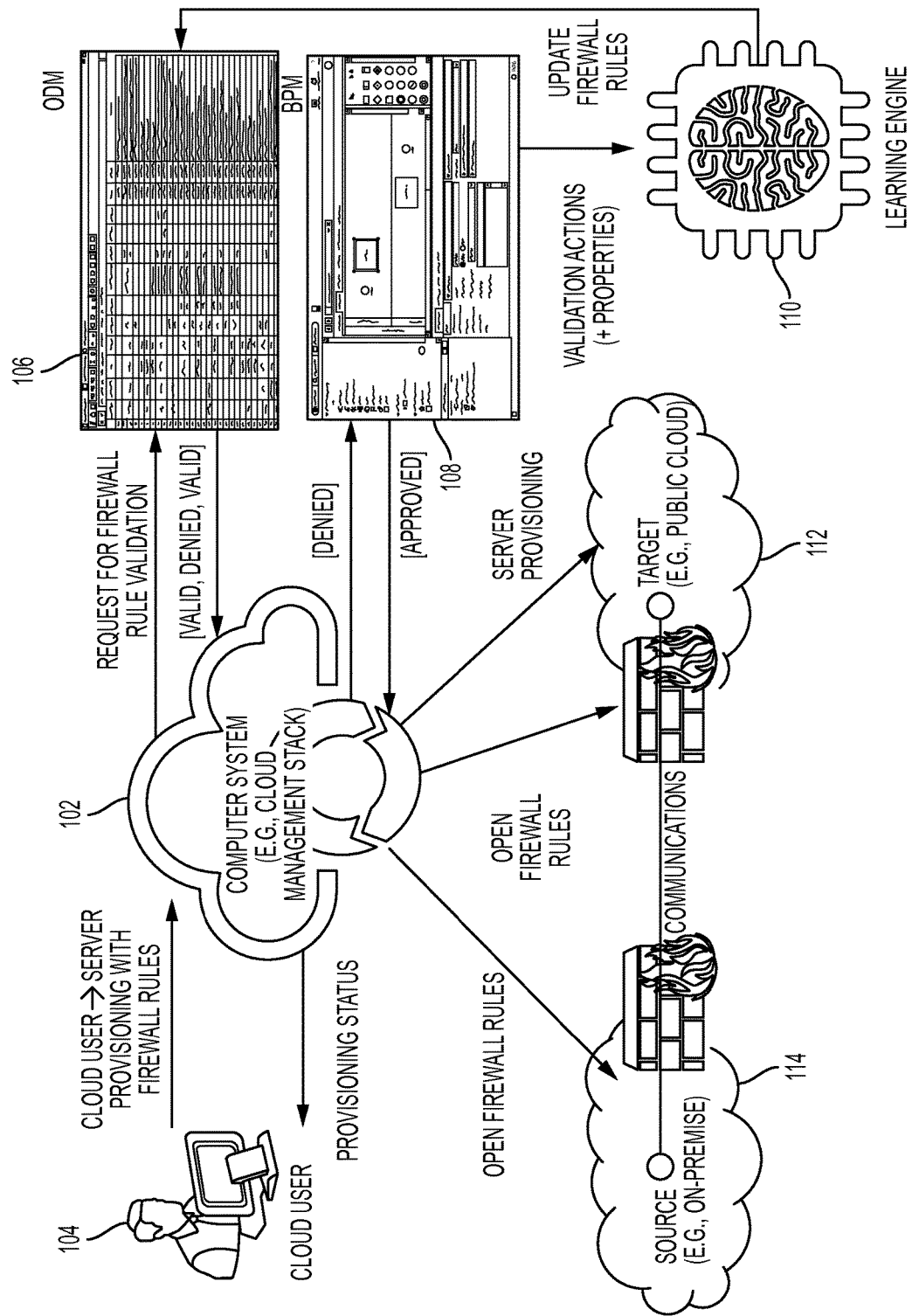
FIG. 1 is a diagram shown a system overview in one embodiment of the present disclosure.

System, method and techniques are disclosed for validating enterprise firewall rules through Business Process Management (BPM) and Operational Decision Management (ODM). In one embodiment, default firewall rules may be defined as allowed or denied in the ODM rules. With user firewall rule inputs, the ODM validates the firewall rules, and the denied rules are sent to the BPM for further validation, e.g., manual validation by a user. The system, method and/or technique of the present disclosure in one embodiment may learn the specifications and properties of denied firewall rules and encode them into the ODM. In one aspect, the present disclosure also discloses an active learning methodology, system and/technique, which enables to capture subject matter expert's (SME's) experience in validating firewall rules.

A processing engine, e.g., executable on one or more hardware, computer, or micro-processors, may be provided that validates firewall rules based on pre-defined ODM rules and learns the specifications and properties of firewall rules on the fly, e.g., dynamically in real-time. The processing engine may be integrated with a cloud management stack to provision computing resources with defined firewall rules. Such processing engine may be used in a hybrid cloud, for example, in which each cloud has its own firewall schemes. The processing engine may secure the connection between on-premise data centers and cloud data centers by removing error that may typically occur in manual or human operated fire walls.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In one aspect, the system, method and techniques of the present disclosure may provide for suggesting an automated firewall validation process management through BPM and ODM, provide for a learning component to educate the properties and specifications of the denied firewall rules that can be inserted into the ODM rules automatically. In one aspect, the system, method and techniques of the present disclosure may exclude the human processes, which make take a long time, to validate the firewall rules, e.g., so that users or the like can access servers in time.

In this way, for example, rapid service provisioning is provided, e.g., by reducing the manual effort, which may take a long time, to validate each firewall rules. Furthermore, time-to-value service operations, automation of firewall rules validation and learning unseen firewall rules may be provided.

Figure 3:
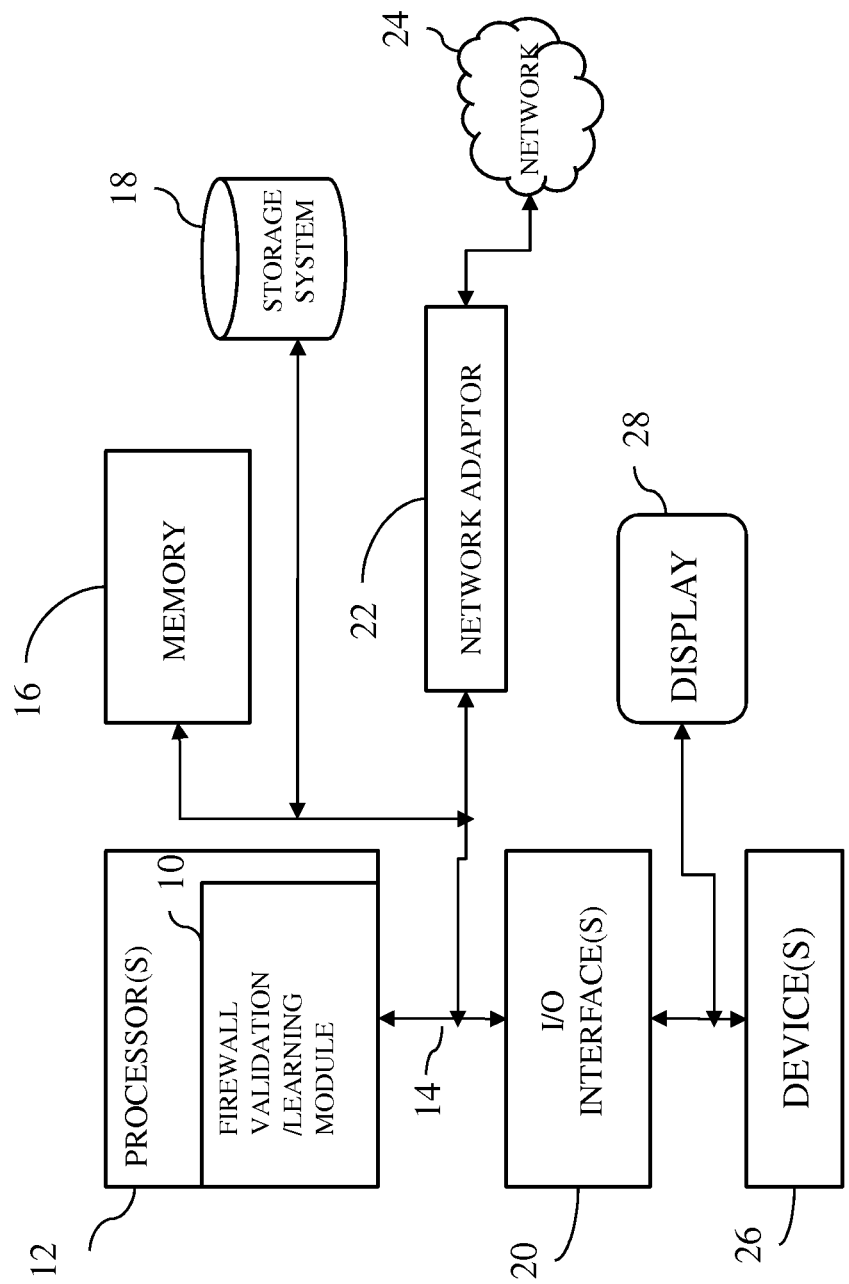
FIG. 3 illustrates a schematic of an example computer or processing system that may implement a firewall rule validation and provisioning system in one embodiment of the present disclosure.

FIG. 1 is a diagram shown a system overview and logic flow of system components in one embodiment of the present disclosure. A computer system 102 such as a cloud management stack receives a request from a user 104 for provisioning of a server with one or more fire wall rules. The computer system 102 sends the firewall rules to an ODM 106 for validation. The ODM 106, for example, runs on one or more hardware processors operatively coupled with one or more storage devices that store firewall rules, e.g., in a database table. Responsive to receiving the request for firewall rule validation, the ODM 106 checks the firewall rules against the existing ODM rules table and determines whether to approve or deny the firewall rule. FIGS. 2 and 3 show examples of firewall rules table that stores a plurality of firewall rules.

ODM 106 determines the approved and denied firewall rules and sends a reply to the computer system 102 as to which firewall rules are valid (or approved) and which are denied. ODM 106, for example, stores firewall rules that are pre-approved, for example, complete rule templates.

Responsive to receiving one or more denied firewall rules, the computer system 102 sends the denied firewall rules to a BPM 108 for further validation through one or more pre-defined processes. An example of this BPM process is described with reference to FIG. 4 in one embodiment. The BPM 108, for example, runs on one or more hardware processors which may be operatively coupled with one or more storage or memory device, and may include a user interface which allows a system administrator or like user to update and/or validate one or more firewall rules. For instance, responsive to determining that the user requested one or more custom firewall rules are not defined in the rule system (e.g., of the ODM 106), the rules may be sent for further validation (e.g., manually by an administrator or the like) through a business process.

After the BPM process that further validates the firewall rules, BPM 108 sends the results to the computer system 102 and updates a firewall rule learning engine 110. The results include whether a requested firewall rule is denied or approved, and the reason why it is denied or approved. The firewall rule learning engine 110 checks a template database to find similar rules with missing information. For example, the firewall rule learning engine 110 looks for all the information needed to fill the row containing rule attributes of a template shown in FIG. 2. For instance, a requested firewall rule may not include all attributes of elements (e.g., shown in FIG. 2) for the rule to be validated. In one embodiment, the firewall rule learning engine 110 may wait for another same request that may include more verbose information to be requested to BPM in order to collect more information. If a requested rule has missing information, it does not have enough substantiating data that can be used in ODM as pre-approved rules. For instance, partial information may not be enough for the rule validation.

The firewall rule learning engine 110 checks whether all the requirements are met to define a rule that can be stored as part of the ODM rules data (e.g., 106), e.g., whether enough data exists to create a firewall rule, and if so updates the ODM 106. All requirements are met, for example, if all attributes specified in a rule template are available for the firewall rule request, for example, if all columns shown in FIG. 2 can be filled in with corresponding data.

For example, the learning process captures actions (e.g., confirming the traffic is encrypted) taken by a system administrator or the like and puts them into a database, e.g., a relational database or files with JSON format. For instance, the actions may be interpreted as one of columns shown in FIG. 2. In this example case, the traffic is encrypted means 'Encrypted' column is set to 'True'. A learning algorithm categorizes rules that can be standardized for the automated rule system. The learning algorithm suggests a new rule and its reasoning on why the rules need to be inserted into the system (e.g., attributes are captured and collected to create a rule). A security expert may examine the rules defined through the learning process, and validate whether the rules follow the security constraints. The validated rules are inserted into the rule system and used for subsequent rule validation.

A firewall rules learning engine may validate the firewall rules based on pre-defined ODM rules and learn the specifications and properties of firewall rules dynamically. The firewall rules learning engine may be integrated with a cloud management stack to provision computing resources with firewall rules defined and used in a hybrid cloud, which may each have its own firewall schemas. The system and/or method of the present disclosure in one embodiment secure the connections between on-premise data centers and cloud data centers by removing mistakes that may occur if such rule provisioning is performed manually.

The computer system 102 provisions the server 112 with the approved firewall rules (e.g., approved by the ODM 106 and/or the BPM 108), opening the firewall rules, e.g., between a source server 114 and a target server 112.

The computer system 102 sends the provisioning status to the user 104.

FIG. 2 shows an example ODM rule validation table in one embodiment of the present disclosure. The table columns are not fixed in that new criteria can be added any time when the firewall validator decides to consider other one or more properties. For instance, if all properties (attributes) shown in the columns of the table are available, a new rule may be created.

Figure 4:
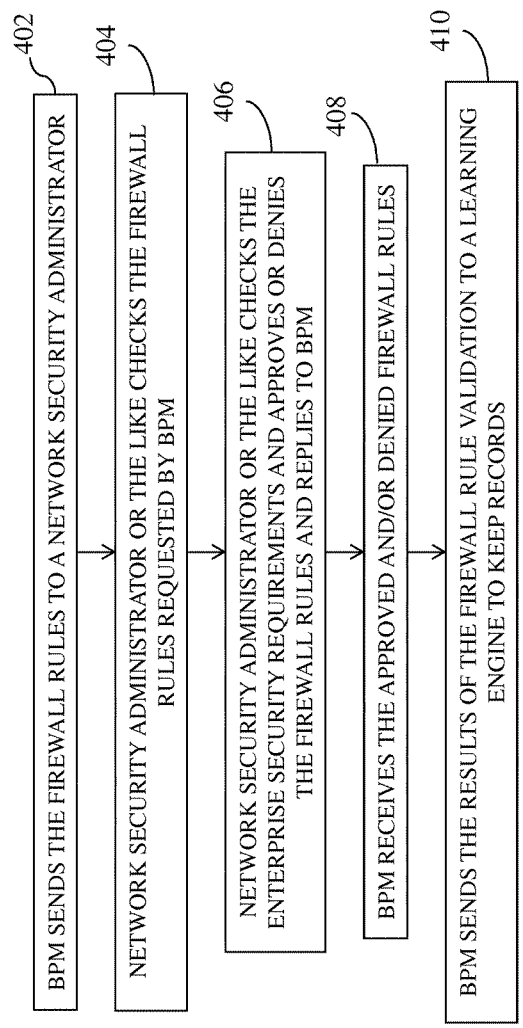
FIG. 4 is a flow diagram illustrating a BPM rule validation process in one embodiment of the present disclosure.

FIG. 4 is a flow diagram illustrating a BPM rule validation process in one embodiment of the present disclosure. The process shown in FIG. 4 may be encoded in BPM. For example, at 402, BPM sends the firewall rules to a network security administrator. At 404, the network security administrator checks the firewall rules requested by BPM. At 406, the network security administrator checks the enterprise security requirements and approves or denies the firewall rules and replies to BPM. At 408, BPM receives the approved and/or denied firewall rules. At 410, BPM sends the results of the firewall rule validation to a learning engine to keep records.

The ODM may also be updated with rules. For instance, if the rule is a new rule that can be defined correctly, BPM encodes the rule into the ODM such that the next time a server provisioning is requested with the same firewall rule, the rule request may be validated automatically. If this is a new rule that cannot be defined correctly, BPM finds missing information and records it in a database.

Figure 5B:
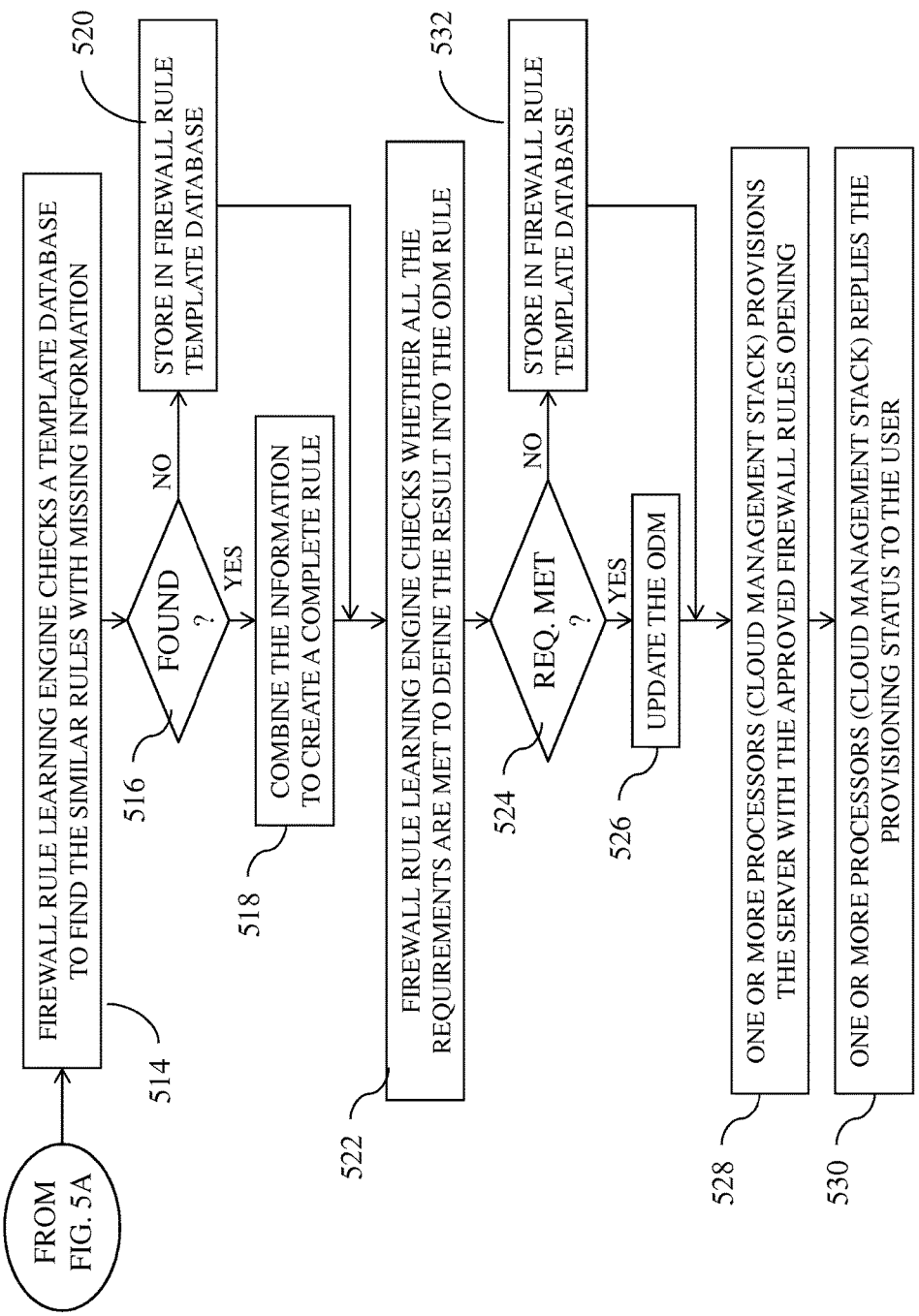

FIGS. 5A and 5B show a flow diagram showing a process overview in one embodiment of the present disclosure. At 502, a request may be received by a computer processor, for example functioning as cloud management stack, for example, from a user, to provision a server with one or more firewall rules. At 504, the computer processor sends or transmits, for example, via a communication network or channel, the firewall rules to an ODM or the like for validation. As described above, the ODM may run on one or more computer processors. The ODM checks its validation rules table (e.g., having pre-defined rules), e.g., stored on a storage or memory device, and determines one or more approved and/or denied rules. At 506, approved and/or denied firewalls are received from the ODM, for example, by the computer processor functioning as cloud management stack. Responsive to receiving one or more denied firewalls, the computer processor (e.g., functioning as cloud management stack) sends the denied firewall rules for further validation, e.g., over a computer-implemented communication network or channel, for example, to one or more hardware or computer processors that are running a BPM or like process at 508. An administrator via a user interface interfacing with the BPM process may manually validate one or more of the denied rules shown at 510. Such administrator may update a reason as to why a firewall is to be approved or denied.

At 512, the BPM or the like sends, for example, over a computer-implemented communication network or channel, the results of validation to the computer processor (e.g., functioning as cloud management stack) and updates the firewall rule learning engine. In one embodiment, the firewall rule learning engine may be implemented as a stand-alone application or program that collects validation request information, learns them, and provide feedbacks to ODM or the like to create new rules that are allowed. In one embodiment, such firewall rule learning engine may run continuously and repeatedly without exceptions on a hardware processor.

At 514, the firewall rule learning engine checks a template database to find similar rules with missing information. At 516, if the information that is missing is found in the template database, the firewall rule learning engine combines the information in the template database with the requested firewall rule to create a complete rule at 518. For instance, the learning engine collects validation request information, completes the rule template, and pushes the complete rules to an ODM engine or the like to augment the additional pre-approved rules.

If the missing information is not found in the template database, the requested firewall rule is stored in the firewall rule template database at 520. In one embodiment, the template database 520 stores information such as those shown in FIG. 2, which include properties or attributes for a rule. The information, for example, may be stored in JSON format, for instance, for flexibility such that the attributes may be changed, for example, added or deleted or modified. The firewall rule learning engine attempts to fill the property information (e.g., fill all the columns of the table) to find additional complete rules that can be used as pre-approved rules.

At 522, the firewall rule learning engine checks whether all requirements are met to define a rule into the ODM rules database. For instance, as a part of finding a new pre-approved rule, the firewall rule learning engine checks whether all the information (table columns) are collected. Responsive to determining that all information is available, the firewall rule learning engine pushes the data (complete rule properties) into the ODM.

Responsive to determining that the requirements are met at 524, the firewall rule learning engine creates a rule based on the information found in the template database and updates the ODM at 526.

Responsive to determining that the requirements are not met at 524, the firewall rule learning engine stores the requested firewall rule in the firewall rule template database 532. The firewall rule learning engine waits to collect related information to complete the rule template.

At 528, the computer processor receives the approved firewall rules and provisions the server with the approved firewall rules.

At 530, the computer processor sends the provisioning status to the user.

following describes an SVM-based active learning algorithm for multi-label for firewall rule validation template. The learning algorithm categorizes rules that can be standardized for the automated rule system.

Inputs: Labeled set $D_l$, unlabled set $D_u$, number of steps T, number of examples per iteration S t=1;
Algorithm:
while t<=T do
Train a multi-label SVM classifier f based on training data $D_l$
for each instance x in $D_u$ do
Predict its label vector y using the LR(loss reduction)-based prediction method
$D^*_s = \mathrm{argmax}_{DS}(\Sigma_{x \in DS}\Sigma_{i=1}((1-y^i f_i(x))/2))$
constrained to $y^i \in \{-1, 1\}$
(equation for Maximum loss reduction with maximal confidence)
Calculate the expected loss reduction with the most confident label vector y,
$\mathrm{score}(x) = \Sigma_{i=1}^k ((1-y^i f_i(x))/2)$
Sort score(x) in decreasing order for all x in $D_u$
Select a set of S examples D* with the largest scores (or experienced SME input),
and update the training set $D_l \leftarrow D_l + D^*_s$
end for
Train the multi-label learner 1 with $D_l$
t=t+1;
end while
  $f_i(x)$ is an SVM classifier associated with class i.
  $x_1 \ldots x_n$ data points (e.g., feature vector for each x–[source zone, destination zone, port, protocol, Confidential Information, Sensitive Personal Information, Encrypted, For Tunnel, Allow Interactive Login, and/or others]).

The following shows an example firewall validation template. This example is in JavaScript Object Notation (JSON) format, a data-interchange format.

```
{
'templates': [
{ 'id': 1, 'fields': {'source_subnet': 'x.xx.xx.x', 'source_zone': 'Blue', 'destination_subnet':
'yy.yy.yy.yyy', 'destination_zone': 'Yellow', 'port': 'ssh/22', 'protocol': 'SSH', 'authenticated':
'password or certificate', 'sensitive_personal_info': true, 'encrypted': false, 'tunnel': false,
'interactive_login': true}, 'result': 'approved', 'reason': 'passed ODM rule validation'},
{ 'id': 2, 'fields': {'source_subnet': 'x.xx.xx.x', 'source_zone': 'Blue', 'destination_subnet':
'yy.yy.yy.yyy', 'destination_zone': 'Yellow', 'port': 'ssh/443', 'protocol': 'CIFS',
'authenticated': 'password or certificate', 'sensitive_personal_info': true, 'encrypted': false,
'tunnel': false, 'interactive_login': true}, 'result': 'denied', 'reason': 'XYZ corp security
violation'},
...
]
}
```

In one embodiment, a firewall rule learning engine (e.g., shown at 110 in FIG. 1) is provided that actively learns firewall rule validations, for example, to automatically be able to validate or invalidate a firewall rule. For example, the firewall rule learning engine may allow for providing automated firewall validation, e.g., when the server is provisioned, e.g., with user provided firewall rules, wherein the firewall rule learning engine learns which rules to validate and invalidate, e.g., as the situation changes. In the present disclosure in one embodiment, an online build provisioning and firewall validation may be performed, e.g., at the same time.

The firewall rule learning engine in one embodiment may implement or execute one or more machine learning algorithms, for example, a support vector machine (SVM). The FIG. 3 illustrates a schematic of an example computer or processing system that may implement a firewall validation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessorbased systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of automatically validating a firewall rule for provisioning in a computer system, comprising executing on one or more computer processors:
    receiving from a user device one or more firewall rules for provisioning on a server;
    determining based on predefined firewall rules, whether to approve one or more of the firewall rules and deny one or more of the firewall rules;
    responsive to determining that one or more of the firewall rules are denied, performing additional validation of one or more of the firewall rules that are denied;
    updating a firewall rule learning engine with a result of the additional validation, wherein based on the result of the additional validation, the firewall rule learning engine updates the predefined firewall rules;
    provisioning one or more of the firewall rules that are approved on the server; and
    opening the one or more of the firewall rules between a source server and a target server,
    wherein one or more of the computer processors automatically secure connections between the source server and the target server.

2. The method of claim 1, wherein the firewall rule learning engine creates one or more new firewall rules based on the additional validation and adds the new firewall rules to the predefined firewall rules.

3. The method of claim 1, wherein the firewall rule learning engine implements a machine learning algorithm to automatically create the new firewall rules.

4. The method of claim 3, wherein the machine learning algorithm includes a support vector machine-based algorithm.

5. The method of claim 1, further comprising sending provisioning status to the user device.

6. The method of claim 1, wherein a cloud management stack receives the request and performs the provisioning.

7. A non-transitory computer readable storage medium storing a program of instructions executable by a machine to perform a method of automatically validating a firewall rule for provisioning in a computer system, the method comprising:
- receiving from a user device one or more firewall rules for provisioning on a server;
- determining based on predefined firewall rules, whether to approve one or more of the firewall rules and deny one or more of the firewall rules;
- responsive to determining that one or more of the firewall rules are denied, performing additional validation of one or more of the firewall rules that are denied;
- updating a firewall rule learning engine with a result of the additional validation, wherein based on the result of the additional validation, the firewall rule learning engine updates the predefined firewall rules;
- provisioning one or more of the firewall rules that are approved on the server; and
- opening the one or more of the firewall rules between a source server and a target server,
- wherein one or more of the computer processors automatically secure connections between the source server and the target server.

8. The non-transitory computer readable storage medium of claim 7, wherein the firewall rule learning engine creates one or more new firewall rules based on the additional validation and adds the new firewall rules to the predefined firewall rules.

9. The non-transitory computer readable storage medium of claim 7, wherein the firewall rule learning engine implements a machine learning algorithm to automatically create the new firewall rules.

10. The non-transitory computer readable storage medium of claim 9, wherein the machine learning algorithm includes a support vector machine-based algorithm.

11. The non-transitory computer readable storage medium of claim 7, further comprising sending provisioning status to the user device.

12. The non-transitory computer readable storage medium of claim 7, wherein a cloud management stack receives the request and performs the provisioning.

13. A system of automatically validating a firewall rule for provisioning in a computer system, comprising:
- a storage device;
- one or more computer processors operatively coupled to a communication network, one or more of the computer processors operable to receive from a user device one or more firewall rules for provisioning on a server,
- one or more of the computer processors determining based on predefined firewall rules stored on the storage device, whether to approve one or more of the firewall rules and deny one or more of the firewall rules,
- responsive to determining that one or more of the firewall rules are denied, one or more of the computer processors performing additional validation of one or more of the firewall rules that are denied;
- a firewall rule learning engine coupled to one or more of the computer processors;
- one or more of the computer processors updating the firewall rule learning engine with a result of the additional validation;
- based on the result of the additional validation, the firewall rule learning engine operable to update the predefined firewall rules;
- one or more of the computer processors operable to provision one or more of the firewall rules that are approved on the server;
- one or more of the computer processors opening the one or more of the firewall rules between a source server and a target server, wherein one or more of the computer processors automatically secure connections between the source server and the target server.

14. The system of claim 13, wherein the firewall rule learning engine creates one or more new firewall rules based on the additional validation and adds the new firewall rules to the predefined firewall rules.

15. The system of claim 1, wherein the firewall rule learning engine implements a machine learning algorithm to automatically create the new firewall rules.

16. The system of claim 15, wherein the machine learning algorithm includes a support vector machine-based algorithm.

17. The system of claim 13, wherein one or more of the computer processors sends provisioning status to the user device.

18. The system of claim 13, wherein one or more of the computer processors runs a cloud management stack that receives the request and performs the provisioning.

* * * * *